(12) United States Patent
Otsuki

(10) Patent No.: US 9,432,650 B2
(45) Date of Patent: Aug. 30, 2016

(54) IMAGE DISPLAY APPARATUS, IMAGE CAPTURING APPARATUS, AND METHOD OF CONTROLLING IMAGE DISPLAY APPARATUS

(71) Applicant: CANON KABUSHIKI KAISHA, Tokyo (JP)

(72) Inventor: Jun Otsuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/508,397

(22) Filed: Oct. 7, 2014

(65) Prior Publication Data

US 2015/0103202 A1   Apr. 16, 2015

(30) Foreign Application Priority Data

Oct. 10, 2013 (JP) ................. 2013-213222

(51) Int. Cl.
| | |
|---|---|
| H04N 5/232 | (2006.01) |
| H04N 9/804 | (2006.01) |
| H04N 5/77 | (2006.01) |
| H04N 1/32 | (2006.01) |

(52) U.S. Cl.
CPC ........ H04N 9/8047 (2013.01); H04N 1/32101 (2013.01); H04N 5/23245 (2013.01); H04N 5/772 (2013.01); H04N 2201/325 (2013.01)

(58) Field of Classification Search
CPC ............................ H04N 5/772; H04N 9/8047
See application file for complete search history.

(56) References Cited

U.S. PATENT DOCUMENTS

| | | | | |
|---|---|---|---|---|
| 8,749,666 B2* | 6/2014 | Tsuda | .................... | H04N 5/772 348/220.1 |
| 8,848,067 B2* | 9/2014 | Mori | .................... | G11B 27/034 348/220.1 |
| 8,878,951 B2* | 11/2014 | Minobe | ................. | H04N 5/772 348/220.1 |
| 2006/0164519 A1* | 7/2006 | Kaku | ..................... | H04N 5/772 348/222.1 |
| 2007/0109428 A1* | 5/2007 | Suzuki | ................... | H04N 5/772 348/231.99 |
| 2008/0232779 A1* | 9/2008 | Endo | ..................... | H04N 5/232 386/224 |
| 2009/0060447 A1* | 3/2009 | Nakao | ................... | H04N 5/232 386/354 |
| 2009/0086057 A1* | 4/2009 | Han | .................. | H04N 5/23248 348/231.2 |
| 2009/0244324 A1* | 10/2009 | Saito | ................. | H04N 5/23219 348/231.99 |

FOREIGN PATENT DOCUMENTS

| | | |
|---|---|---|
| JP | 2006-229474 A | 8/2006 |
| JP | 2011-244423 A | 12/2011 |

* cited by examiner

*Primary Examiner* — Amy Hsu
(74) *Attorney, Agent, or Firm* — Cowan, Liebowitz & Latman, P.C.

(57) ABSTRACT

An image display apparatus which displays an image, and selectively reads out one of a RAW image and a first developed image obtained by performing a developing process and a compression process for the RAW image, as a candidate image to be displayed following a currently displayed image, from a storage medium storing the RAW image and the first developed image, in accordance with the currently displayed image The apparatus also performs a developing process for the RAW image with higher image quality than the first developed image, performs a decompression process for the developed image, stores the candidate image which is processed by the development or the decompression so as to be displayed, and controls to display the stored candidate image on a display unit by switching from the currently displayed image to the candidate image, in response to an instruction to switch the displayed image.

7 Claims, 8 Drawing Sheets

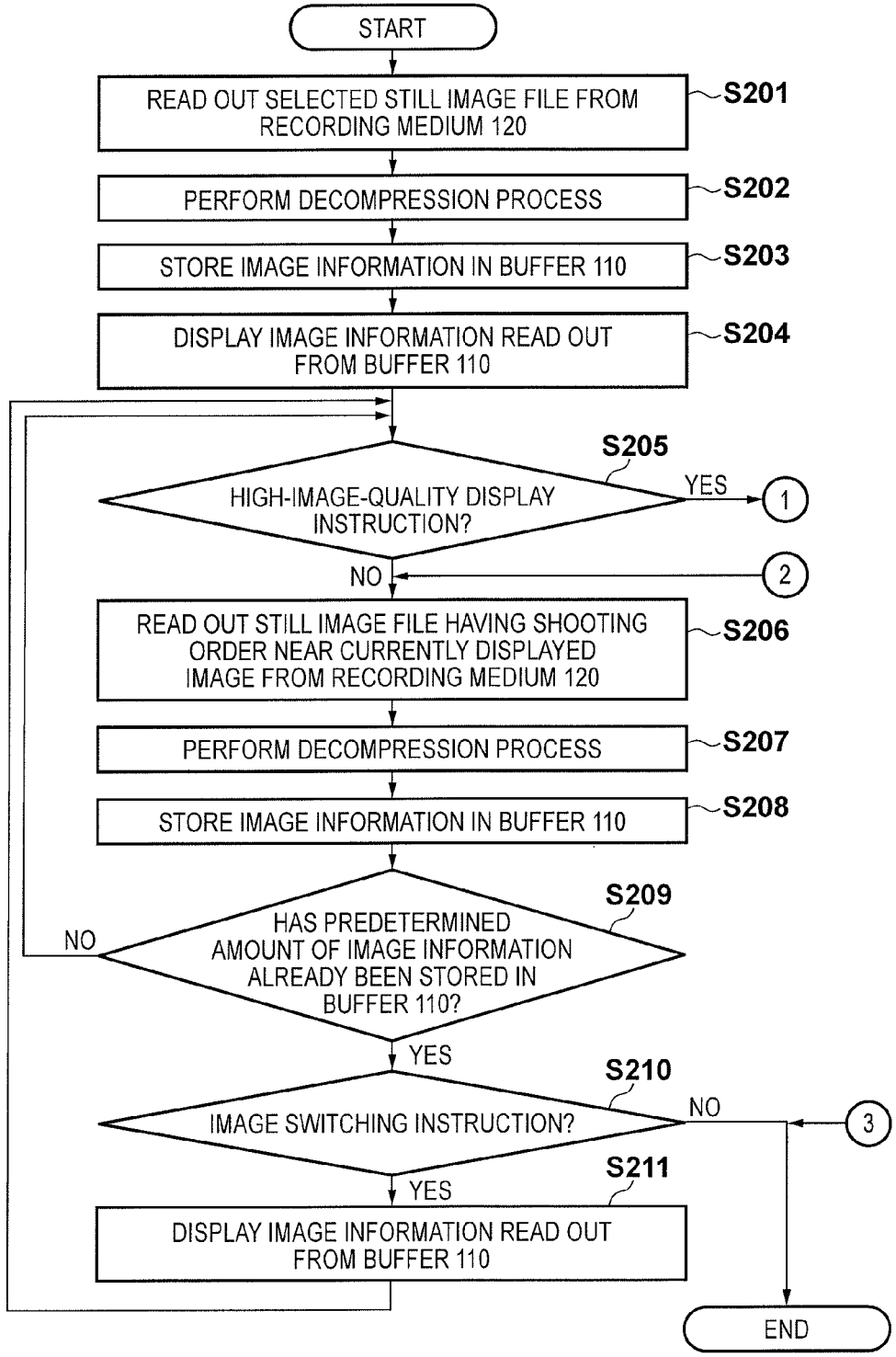

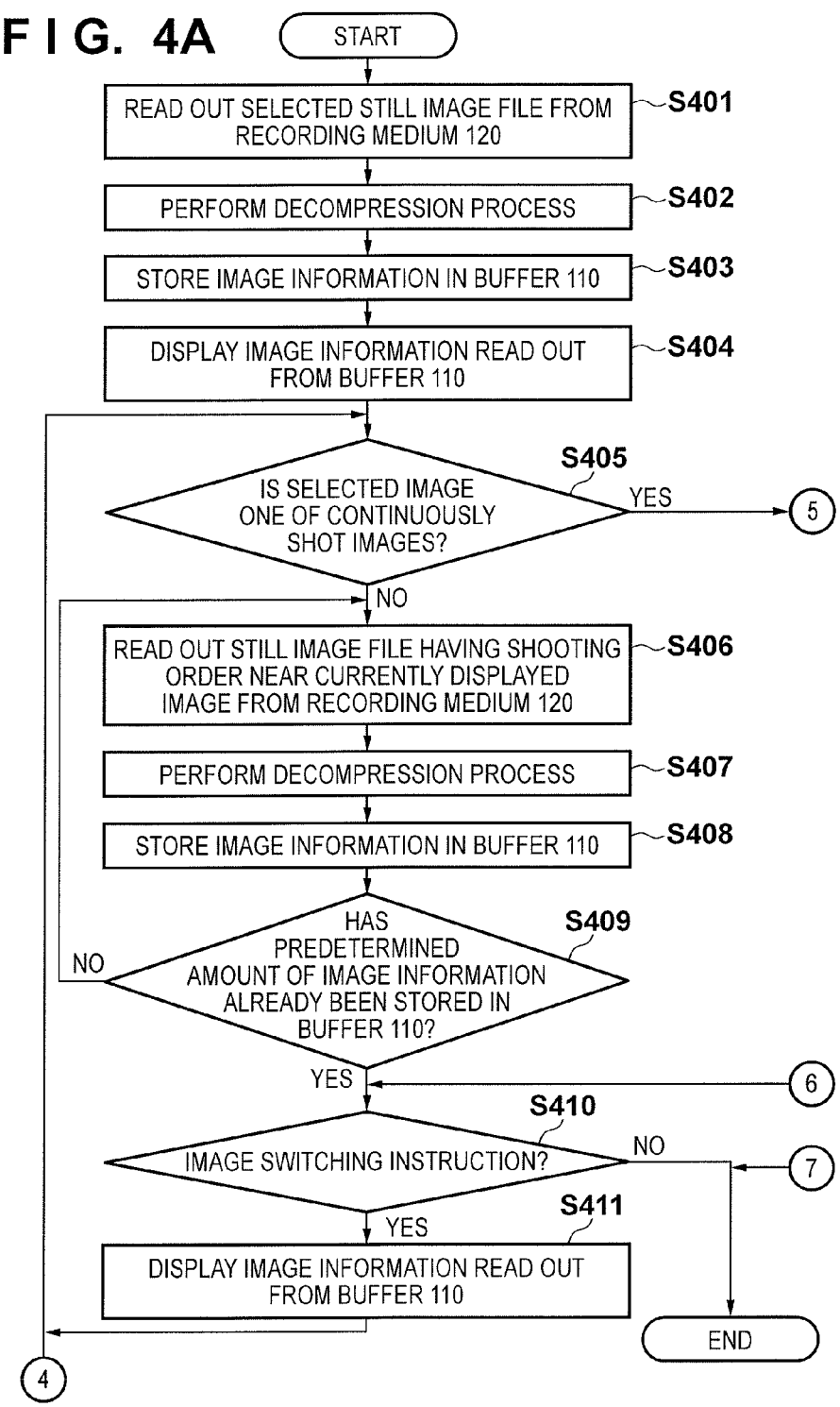

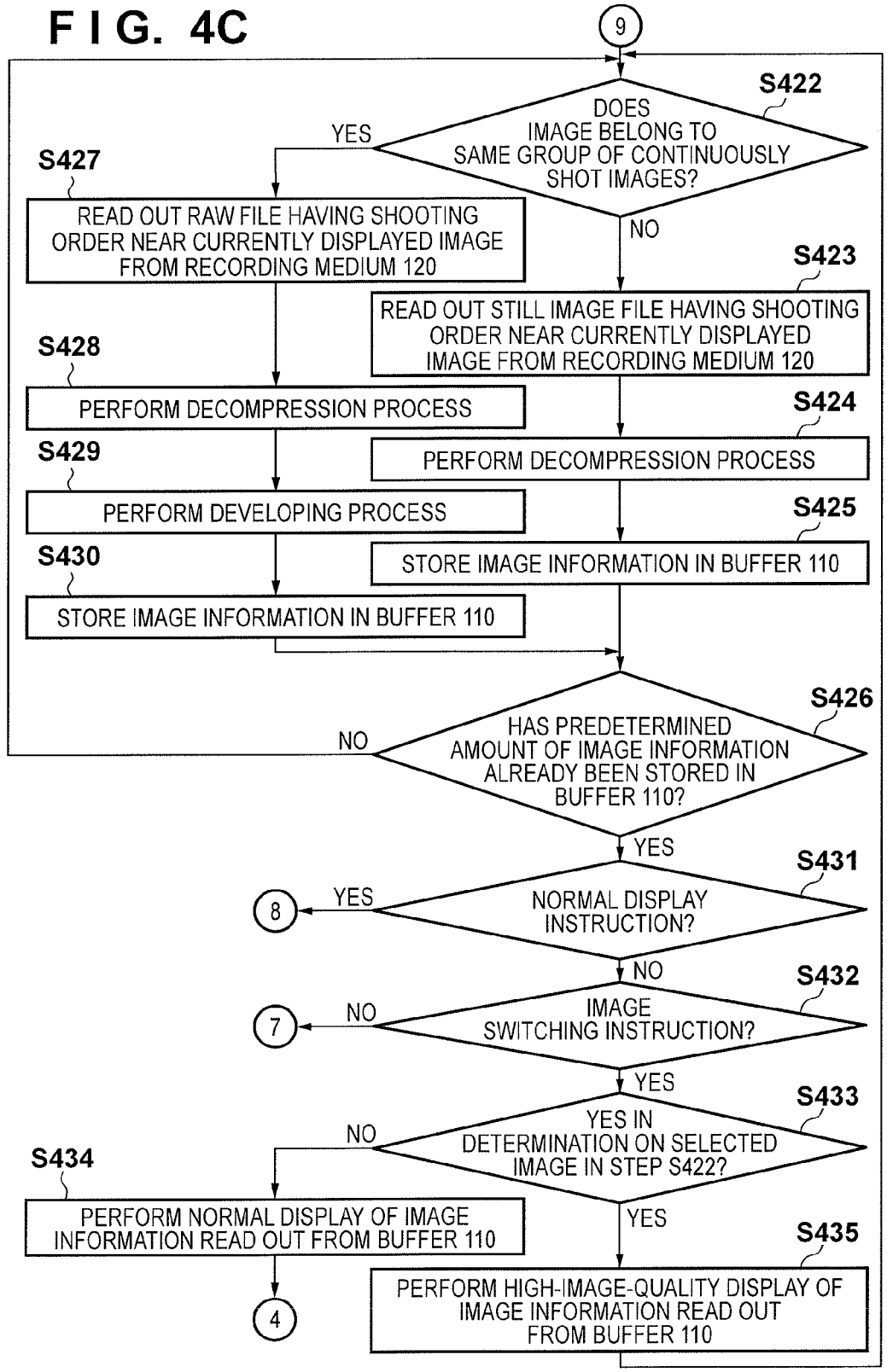

IMAGE DISPLAY APPARATUS, IMAGE CAPTURING APPARATUS, AND METHOD OF CONTROLLING IMAGE DISPLAY APPARATUS

BACKGROUND OF THE INVENTION

1. Field of the Invention

The present invention relates to an image display apparatus, an image capturing apparatus, and a method of controlling the image display apparatus.

2. Description of the Related Art

A conventional image capturing apparatus performs a so-called developing process including debayering (de-mosaicing) raw image information (RAW image) captured by an image sensor, converting the information into signals formed from a luminance signal and color difference signals, and performing noise reduction, optical distortion correction, and image optimization for each signal. In general, then, the apparatus compression encodes the luminance and color difference signals having undergone the developing process by a coding scheme such as JPEG and records the resultant signals in a recording medium.

Some image capturing apparatuses can record a RAW image. Although a RAW image contains an enormous amount of data required for recording, it is possible to suppress correction and degradation with respect to the original image to the minimum and to perform editing after image shooting. For this reason, advanced users like to use such apparatuses.

With advances in image sensors, the number of pixels per image in recent image capturing apparatuses has greatly increased. In addition, there is a tendency to increase the number of images which can be continuously captured per sec. This synergistically increases the throughput required to perform a developing process including a debayer process, noise removal, and optical distortion correction for a RAW image, resulting in requiring an enormous circuit and power consumption for performing a developing process in real time concurrently with image shooting. In some cases, the occupation of a circuit by a developing process and a limitation on power consumption can lead to incapability to implement high image shooting performance.

On the other hand, as disclosed in Japanese Patent Laid-Open No. 2011-244423, in the arrangement configured to record a RAW image without developing it, although the throughput associated with developing at the time of image shooting may be reduced, it is difficult to quickly play back/display the image, because the image is recorded in an undeveloped state. As described above, the conventional RAW image recording scheme has sometimes degraded the convenience for the user.

In contrast to this, Japanese Patent Laid-Open No. 2006-229474 has proposed a method of generating a JPEG image for playback/display and recording it together with a RAW image in a recording medium at the time of RAW image recording. The above JPEG image for playback/display is designed to be displayed/played back on a display apparatus such as a liquid crystal monitor which an image capturing apparatus generally has. Although it depends on the resolution of a display apparatus, a JPEG image for playback/display is generally lower in resolution than a RAW image and a JPEG image to be recorded in a recording medium, and hence is low in throughput. Therefore, even if a JPEG image for playback/display is processed parallel to RAW image recording, the load does not increase.

SUMMARY OF THE INVENTION

When, however, playing back a JPEG image for playback/display generated by the method disclosed in Japanese Patent Laid-Open No. 2006-229474 described above, although an entire image can be displayed on a display apparatus without any problem, a RAW image needs to be developed and displayed to display the image with high quality because the JPEG image for playback/display lacks resolution. In contrast, when displaying a RAW image on the display apparatus, it is necessary to read out RAW image data from a recording medium, perform a decompression process by decoding, and then perform a developing process. It therefore takes much time to switch displayed images after issuing a display instruction.

The present invention shortens the time to switch displayed images.

One aspect of exemplary embodiments of the invention relates to an image display apparatus comprising a display unit configured to display an image, a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image, a developing unit configured to perform a developing process for the RAW image read out by the readout unit with higher image quality than the first developed image, a decompression unit configured to perform a decompression process for the developed image read out by the readout unit, a storage unit configured to store the candidate image which is processed by the developing unit or the decompression unit so as to be displayed on the display unit, and a control unit configured to perform control to display the candidate image stored in the storage unit on the display unit by switching from the currently displayed image to the candidate image, in response to an instruction to switch an image displayed on the display unit.

Another aspect of exemplary embodiments of the invention relates to an image capturing apparatus comprising an image capturing unit configured to capture an image, and an image display apparatus comprising a display unit configured to display an image, a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image, a developing unit configured to perform a developing process for the RAW image read out by the readout unit with higher image quality than the first developed image, a decompression unit configured to perform a decompression process for the developed image read out by the readout unit, a storage unit configured to store the candidate image which is processed by the developing unit or the decompression unit so as to be displayed on the display unit, and a control unit configured to perform control to display the candidate image stored in the storage unit on the display unit by switching from the currently displayed image to the candidate image, in response to an instruction to switch an image displayed on the display unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are flowcharts showing an example of processing at the time of playback in the first embodiment of the present invention;

FIGS. 4A, 4B and 4C are flowcharts at the time of playback described in the second embodiment.

DESCRIPTION OF THE EMBODIMENTS

Embodiments of the present invention will be described below with reference to the accompanying drawings.

First Embodiment

Figure 1:
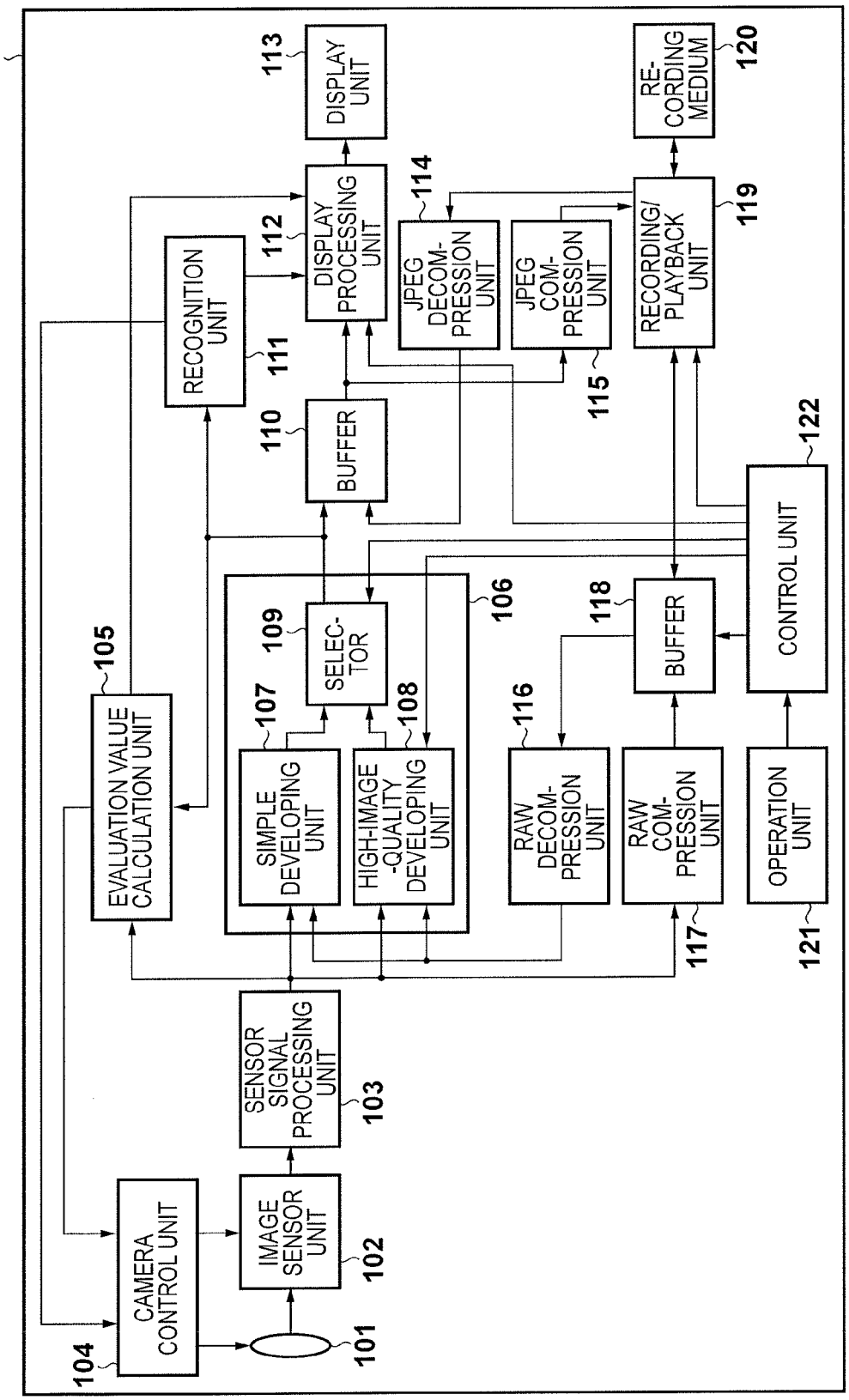
FIG. 1 is a block diagram of an image capturing apparatus corresponding to an embodiment of the present invention.

FIG. 1 is a block diagram showing an example of the arrangement of an image capturing apparatus according to an embodiment of the present invention. An image capturing apparatus 100 shown in FIG. 1 has a function as an image display apparatus which plays back/displays image information from a recording medium as well as recording the image information obtained by image capturing of an object. Therefore, the image capturing apparatus according to the embodiment of the present invention can be expressed as an image processing apparatus, recording apparatus, image display apparatus, playback apparatus, or recording/playback apparatus.

In addition, each block of the image capturing apparatus 100 in FIG. 1 may be configured in the form of hardware by using a dedicated logic circuit or memory except for physical devices such as an image sensor and a display device. Alternatively, each block may be configured in the form of software by causing a computer such as a CPU to execute a processing program stored in a memory. Although the image capturing apparatus 100 can be implemented as a digital camera, it is possible to implement the apparatus as an arbitrary information processing terminal such as a personal computer, smartphone, PDA, or tablet terminal. Note that when the apparatus functions as an image display apparatus or playback apparatus, it does not necessarily have an image shooting function.

Referring to FIG. 1, a control unit 122 includes a CPU and a memory storing control programs executed by the CPU, and controls the overall processing in the image capturing apparatus 100. An operation unit 121 includes input devices such as keys, buttons, and a touch panel which are used by the user to give instructions to the image capturing apparatus 100. The control unit 122 detects an operation signal from the operation unit 121 and performs control to execute an operation corresponding to the user operation. A display unit 113 includes a liquid crystal display (LCD) for displaying an image shot or played back, a menu screen, and various types of information in the image capturing apparatus 100.

When the operation unit 121 issues an instruction to start an image shooting operation, an optical image of an object as an image capturing target is input via an image capturing optical unit 101 and is formed on an image sensor unit 102. A camera control unit 104 controls the operations of the image capturing optical unit 101 and the image sensor unit 102 at the time of image shooting based on evaluation value calculation results concerning an aperture, focus, camera shake, and the like which are acquired by an evaluation value calculation unit 105 and the object information extracted by a recognition unit 111.

The image sensor unit 102 converts light transmitted through red, green, and blue (RGB) color filters arranged for each pixel into an electrical signal. A sensor signal processing unit 103 applies a pixel restoring process to the electrical signal converted by the image sensor unit 102. A restoring process includes a process of interpolating pixels as restoration targets by using neighboring pixel values and a process of subtracting predetermined offset values with respect to missing pixels or the values of low-reliability pixels in the image sensor unit 102. In this embodiment, image information before it is output from the sensor signal processing unit 103 and undergoes a developing process by a developing unit 106 will be referred to as a RAW image indicating a raw (undeveloped) image. In addition, in this embodiment, a debayer process (de-mosaic process) is part of a developing process. However, for example, an image up to the completion of a debayer process may be defined as a RAW image.

The developing unit 106 develops a RAW image. The developing unit 106 includes a plurality of different developing process units, including a simple developing unit 107 as the first developing unit and a high-image-quality developing unit 108 as the second developing unit, and a selector 109 which selects an output from each developing unit. The simple developing unit 107 and the high-image-quality developing unit 108 each perform a so-called developing process including debayering (de-mosaicing) a RAW image, converting the image into signals formed from a luminance signal and color difference signals, and performing removal of noise contained in each signal, optical distortion correction, and image optimization. Assume that in the image capturing apparatus according to this embodiment, the simple developing unit 107 performs a developing process with a limitation that one readout image should have a pixel count equal to or less than a predetermined pixel count (for example, 2,000,000 pixels) as a whole.

The high-image-quality developing unit 108 performs each process more intricately and accurately than the simple developing unit 107. For example, the high-image-quality developing unit 108 performs a developing process such that the pixel count of one entire readout image becomes larger than the predetermined pixel count to which the simple developing unit 107 is limited. Consider a case in which part of an image is selectively read out (or cut out) and developed. In this case as well, the high-image-quality developing unit 108 performs a developing process such that the pixel count of a selected region (object) becomes larger than the pixel count output from the simple developing unit 107, and outputs the resultant image. Although the image developed by the high-image-quality developing unit 108 has high image quality, the developing process performed by the high-image-quality developing unit 108 increases in processing load. For this reason, the high-image-quality developing unit 108 of this embodiment is configured to sequentially and separately perform each process after image shooting instead of being designed for real-time developing concurrent with image shooting.

It is possible to suppress a circuit size and an increase (peak) in power consumption by performing high-image-quality developing after image shooting instead of performing it in real time concurrently with image shooting. On the other hand, the simple developing unit 107 is lower in image quality than the high-image-quality developing unit 108 but is configured such that the throughput associated with developing is set to be lower than that associated with high-image-quality developing so as to perform a developing process at high speed during image shooting. Since the processing load of the simple developing unit 107 is small, the simple developing unit 107 is used to perform real-time developing concurrently with an image shooting operation. The control unit 122 switches the selector 109 in accordance with control corresponding to an operation content instructed by the user with the operation unit 121 or an operation mode under execution.

Although this embodiment has exemplified the arrangement in which the simple developing unit 107 and the high-image-quality developing unit 108 independently exist in the developing unit 106, the present invention incorporates even an arrangement in which one developing unit exclusively performs a simple developing process and a high-image-quality developing process by switching operation modes.

A buffer 110 temporarily stores image information having undergone a developing process by the developing unit 106. A display processing unit 112 reads out desired image information stored in the buffer 110, and displays the information on the display unit 113. The image information having undergone the developing process by the developing unit 106 is also supplied to the evaluation value calculation unit 105. The evaluation value calculation unit 105 calculates evaluation values indicating a focus state and an exposure state from the image information. The image information having undergone the developing process by the developing unit 106 is also supplied to the recognition unit 111. The recognition unit 111 has a function of detecting and recognizing object information in image information. For example, the recognition unit 111 detects a face within a frame displayed based on image information. Upon detecting a face, the recognition unit 111 outputs information indicating the position of the face, and authenticates a specific person based on feature information concerning the face or the like. The image information having undergone the developing process by the developing unit 106 is also supplied to a JPEG compression unit 115.

The JPEG compression unit 115 compresses target image information by high-efficiency coding (compression coding) to generate image information with a compressed information amount, and converts the information into a compressed image file (to be referred to as a still image file or first developed image hereinafter). Although this embodiment uses compression coding based on a JPEG coding scheme, it is possible to use other coding schemes.

On the other hand, a RAW compression unit 117 performs wavelet transform and high-efficiency coding using a differential coding technique or the like for the RAW image output from the sensor signal processing unit 103, converts the resultant image into a compressed image file (to be referred to as a RAW file hereinafter), and stores it in a buffer 118.

A recording/playback unit 119 records a RAW file and the above still image file in a recording medium 120. The recording medium 120 is a built-in large-capacity memory or hard disk, a detachable memory card, or the like. The recording/playback unit 119 functions as a medium control unit which controls writing of still image files and RAW files in the recording medium 120 and reading out of the same files from the recording medium 120.

When starting a playback operation, the recording/playback unit 119 acquires and plays back a desired image file from the recording medium 120. If an image file as a playback target is a RAW file, the recording/playback unit 119 stores the acquired RAW file in the buffer 118. If a playback target file is a still image file, the recording/playback unit 119 supplies the acquired still image file to a JPEG decompression unit 114.

A RAW decompression unit 116 reads out a RAW file stored in the buffer 118, and decompresses the compressed RAW file by decoding it. The RAW file decompressed by the RAW decompression unit 116 is supplied to the simple developing unit 107 and the high-image-quality developing unit 108 in the developing unit 106. The buffer 110 stores a developed image (second developed image), of the image information developed by the simple developing unit 107 and the high-image-quality developing unit 108, which is output from the high-image-quality developing unit 108. The JPEG decompression unit 114 decompresses an input still image file by decoding it, and stores the resultant file as a playback still image in the buffer 110.

The arrangement and basic operation of the image capturing apparatus 100 have been described above. An example of the image capturing apparatus 100 at the time of playback will be described next with reference to the flowcharts of FIGS. 2A and 2B. FIGS. 2A and 2B are flowcharts concerning an example of processing by the image capturing apparatus 100 according to this embodiment at the time of playback. The flowchart of FIGS. 2A and 2B show a processing procedure executed by making the control unit 122 control each processing block. This procedure is implemented by expanding, in a memory (RAM), a program stored in a memory (ROM) of the control unit 122, and making the CPU execute the program. In addition, the flowchart of FIG. 2 is a flowchart starting at a start point where a playback instruction is issued with respect to a desired image file recorded in the recording medium 120.

Figure 2B:
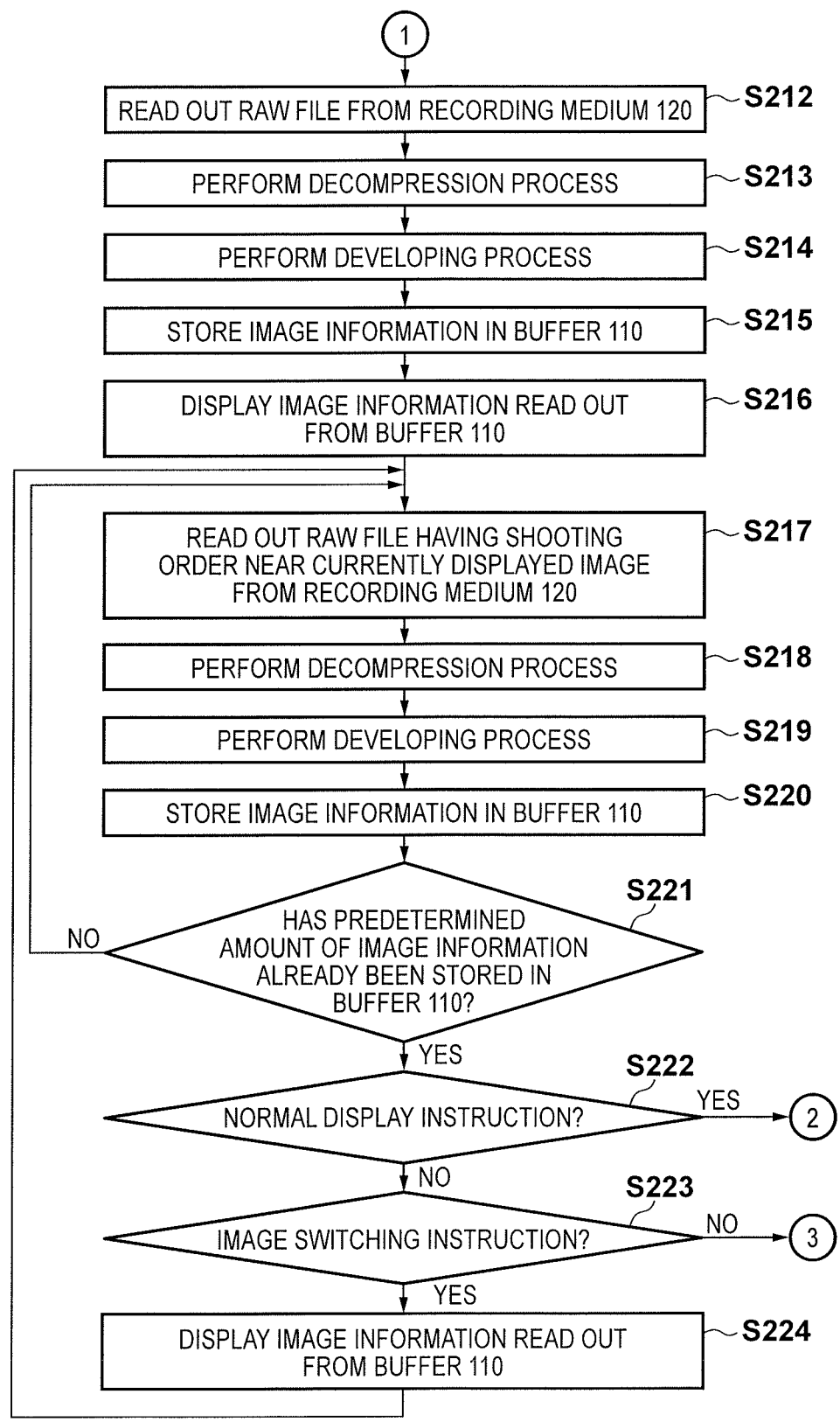

According to the flowcharts of FIGS. 2A and 2B, when the user issues a playback instruction with the operation unit 121 with respect to an image file recorded in the recording medium 120, the control unit 122 performs a playback process for a predetermined image file in accordance with a playback instruction from the operation unit 121. First of all, in step S201, the recording/playback unit 119 reads out, from the recording medium 120, a still image file recorded in the recording medium 120 for which the playback instruction has been issued. In step S202, the JPEG decompression unit 114 decompresses the readout still image field by decoding it. In step S203, the JPEG decompression unit 114 stores the decompressed image information in the buffer 110. In step S204, the display processing unit 112 reads out image information stored in the buffer 110 and displays the information on the display unit 113.

In step S205, the control unit 122 determines whether the user has issued an instruction to perform high-image-quality display with the operation unit 121 with resect to the selected image currently displayed on the display unit 113 to which a playback instruction has been issued. Note that if a high-image-quality instruction has been received, the developed image obtained by developing the RAW file, decompressed by the RAW decompression unit 116, by using the high-image-quality developing unit 108 is displayed as will be described later in this embodiment. At this time, it is possible to display the entire high-image-quality developed image. The following embodiment will exemplify a case in which part of a displayed image is enlarged and displayed, assuming that a high-image-quality display instruction is received as an instruction to enlarge the image. Note that a high-image-quality display instruction is not limited to an enlargement instruction and may be any instruction for executing a function of developing/displaying an image with high image quality in accordance with some kind of operation input from the user. If no high-image-quality instruction has been issued (NO in step S205), the process advances to step S206. If a high-image-quality instruction has been issued (YES in step S205), the process advances to step S212.

In step S206, while the selected image currently displayed on the display unit 113 in step S204 is kept displayed, the recording/playback unit 119 reads out an image to be displayed in place of the displayed image from the recording medium 120. More specifically, the recording/playback unit 119 reads out, from the recording medium 120, a still image file, of image files corresponding to image information stored in the buffer 110 (to be described later), which corresponds to an image shooting date and time order near the image file currently displayed on the display unit 113. In step S207, the JPEG decompression unit 114 decompresses the still image file read out in step S206. In step S208, the image information after the decompression process is stored in the buffer 110.

In step S209, the control unit 122 determines whether the image information stored in the buffer 110 is equal to or more than a predetermined amount. The above predetermined amount is defined as a specification of the image capturing apparatus, for example, decided by a size that can be used as an area for storing image information in the buffer 110. If the control unit 122 determines in step S209 that the image information is less than the predetermined amount (NO in step S209), the process returns to step S205 to determine whether a high-image-quality display instruction has been issued. If the control unit 122 determines in step S209 that the image information is equal to or more than the predetermined amount (YES in step S209), the process advances to step S210. In step S210, the control unit 122 determines whether a displayed image switching instruction has been issued. If the control unit 122 determines in step S210 that a displayed image switching instruction has been issued (YES in step S210), the process advances to step S211, in which the display processing unit 112 reads out newly selected image information from the buffer 110 and displays the information on the display unit 113. The process then returns to step S205. If the control unit 122 determines in step S210 that no instruction to switch displayed images has been issued (NO in step S210), the processing in this flowchart is terminated.

Figure 3A:
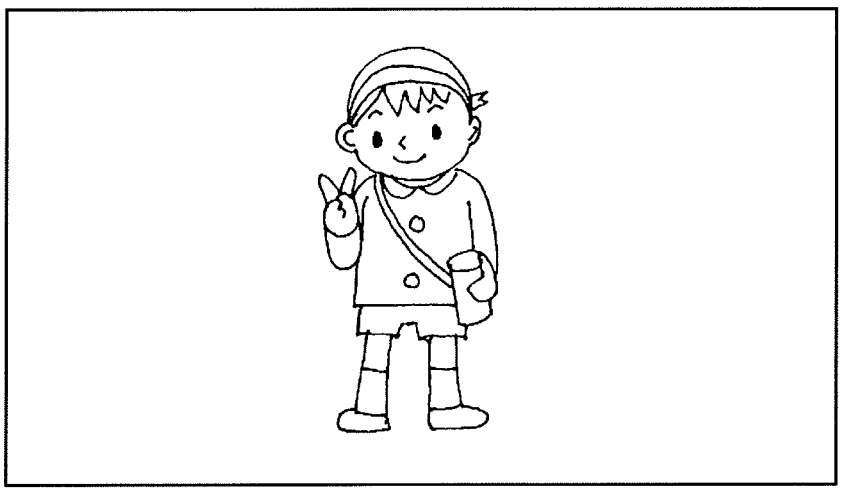
FIGS. 3A and 3B are views showing an example of enlarged image display described in the first embodiment of the present invention.
Figure 3B:

FIGS. 3A and 3B are views showing an example of a display method at the time of image playback in this embodiment. FIG. 3A shows an example of displaying a predetermined entire image on the display unit 113. This display state will be referred to as "entire display". FIG. 3B shows an example of displaying an enlarged image of a partial region of a given image on the display unit 113. This display state will be referred to as "enlarged display". Such enlarged display is generally used to enlarge/display a detailed portion of an object image as shown in FIG. 3B when, for example, checking the correctness of focus immediately after image shooting.

In the image capturing apparatus according to this embodiment, as described above, the pixel count of an image file having undergone a developing process by the simple developing unit 107 is equal to or less than a predetermined pixel count (for example, 2,000,000 pixels). When displaying an entire image on the display unit 113 of this image capturing apparatus, it is possible to display, with sufficient image quality, even the still image file having undergone a developing process by the simple developing unit 107. In contrast to this, when performing enlarged display, the pixel count (equal to or less than 2,000,000 in this image capturing apparatus) of a simply developed still image file can be insufficient for an image to be displayed on the display unit 113. That is, displaying the still image file having undergone a developing process by the simple developing unit 107 will lead to a deterioration in resolution. When performing enlarged display, the high-image-quality developing unit 108 performs a developing process for a RAW file recorded in the recording medium 120 to display an image with a satisfactory resolution even at the time of enlarging/displaying a partial region of the image.

As described above, when enlarging/displaying an image, it is possible to use the developed image with high image quality obtained by the high-image-quality developing unit 108. A display state using such a developed image with high image quality will be referred to as "high-image-quality display". Note however that in high-image-quality display, it is not always necessary to enlarge a partial region of an image, and it is possible to display the entire image on the display unit 113 by using the developed image with high image quality. On the other hand, when displaying an entire image, it is possible to use a still image based on the developed image with a limited pixel count which is obtained from the simple developing unit 107. Such a display state will be referred to as "normal display" in contrast to "high-image-quality display".

Referring back to FIG. 2B, in step S212, the recording/playback unit 119 reads out a RAW file generated together with the still image file of the image displayed on the display unit 113, and stores the file in the buffer 118. In step S213, the RAW decompression unit 116 reads out the RAW file from the buffer 118, decompresses the file by decoding it, and outputs the decompression result to the high-image-quality developing unit 108. In step S214, the high-image-quality developing unit 108 further performs a developing process for the image. In step S215, the image information after the developing process is stored in the buffer 110. In step S216, the display processing unit 112 reads out the image information stored in the buffer 110, and displays the image on the display unit 113.

Note that the high-image-quality developing unit 108 performs a so-called developing process including debayering (de-mosaicing) a RAW image, converting the image into signals formed from a luminance signal and color difference signals, and removing noise contained in each signal, correcting optical distortion, and optimizing the image. The size (pixel count) of an image having undergone a developing process, which is generated by the high-image-quality developing unit 108, remains the same as that of the original image read out from the image sensor unit 102 or is equal to the size set by the user. This image has a pixel count larger than a predetermined pixel count, and has a resolution higher than an image having undergone a developing process by the simple developing unit 107 whose pixel count is limited to 2,000,000 or less. The image developed by the high-imagequality developing unit 108 can therefore provide satisfactory image quality with respect to the requirement for high-image-quality display.

In step S217, the recording/playback unit 119 reads out, from the recording medium 120, an image to be displayed in place of the currently displayed image while the display of the selected image currently displayed on the display unit 113 in step S216 is maintained. More specifically, the recording/playback unit 119 reads out, from the recording medium 120, a RAW file, of image files corresponding to image information not stored in the buffer 110, which corresponds to an image shooting date and time order near the image file selected and currently displayed. The readout file is stored in the buffer 118. In step S218, the RAW decompression unit 116 performs a decompression process for the file. In step S219, the high-image-quality developing unit 108 performs a high-image-quality developing process for the file, and stores the image information having under the developing process in the buffer 110 in step S220.

In step S221, the control unit 122 determines whether the image information already stored in the buffer 110 is equal to or more than a predetermined amount. If the control unit 122 determines that the image information is less than the predetermined amount (NO in step S221), the processing from step S217 to step S220 is repeated. The same processing is repeated until it is determined in step S221 that the image information is equal to or more than the predetermined amount. If the control unit 122 determines in step S221 that the image information is equal to or more than the predetermined amount (YES in step S221), the process advances to step S222. In step S222, the control unit 122 determines whether a normal display instruction has been issued with respect to the image currently displayed on the display unit 113. If a normal display instruction has been issued (YES in step S222), the currently displayed image is entirely displayed, and the process advances to step S206. If no normal display instruction has been issued (NO in step S222), the process advances to step S223. In step S223, the control unit 122 determines whether an image switching instruction has been issued with respect to the image currently displayed on the display unit 113. If a switching instruction has been issued (YES in step S223), the process advances to step S224. In step S224, the display processing unit 112 reads out the selected image information from the buffer 110, and displays the image information on the display unit 113. The process further advances to step S217 to continue the processing. If no image switching instruction has been issued in step S223 (NO in step S223), the processing in this flowchart is terminated.

According to this embodiment, while a given image is displayed, an image expected to be subsequently displayed is read out from the recording medium 120 in advance, and a decompression process and a developing process are performed in advance. This makes it possible to immediately display the next image when an image switching instruction is issued. In addition, when a high-image-quality display instruction is issued, a decompression process and a developing process are performed after a RAW file is read out, instead of a still image file with a low resolution. It is therefore possible to perform enlarged display without lacking resolution and to switch and display images while shortening the time required to switch the images.

Note that in this embodiment, image information immediately before it is read out by the display processing unit 112, that is, image information after a developing process, is generated in advance together with a still image file and a RAW file, and is accumulated in the buffer 110. However, when handling a still image file, information read out from the recording medium 120 may be accumulated in a buffer (not shown in FIG. 1). When handling a RAW file, information read out from the recording medium 120 is accumulated in the buffer 118. Alternatively, information having undergone a RAW decompression process may be accumulated in a buffer (not shown in FIG. 1) in advance. In any of these methods, after an image switching instruction is issued to the operation unit 121, necessary information is read out from a corresponding buffer, and processing up to display is executed afterward. This makes it possible to shorten the time required for display as compared with a playback process starting from reading out a desired image file from the recording medium 120.

Second Embodiment

The second embodiment of the present invention will be described next. This embodiment handles a case in which an image file recorded in a recording medium 120 is an image file generated by continuous shooting. However, an example of the arrangement of an image capturing apparatus described in the embodiment is the same as the arrangement in FIG. 1 described in the first embodiment, and hence a description of the arrangement will be omitted. An operation at the time of playback which differs from that of the image capturing apparatus described in the first embodiment will be described.

Figure 4B:
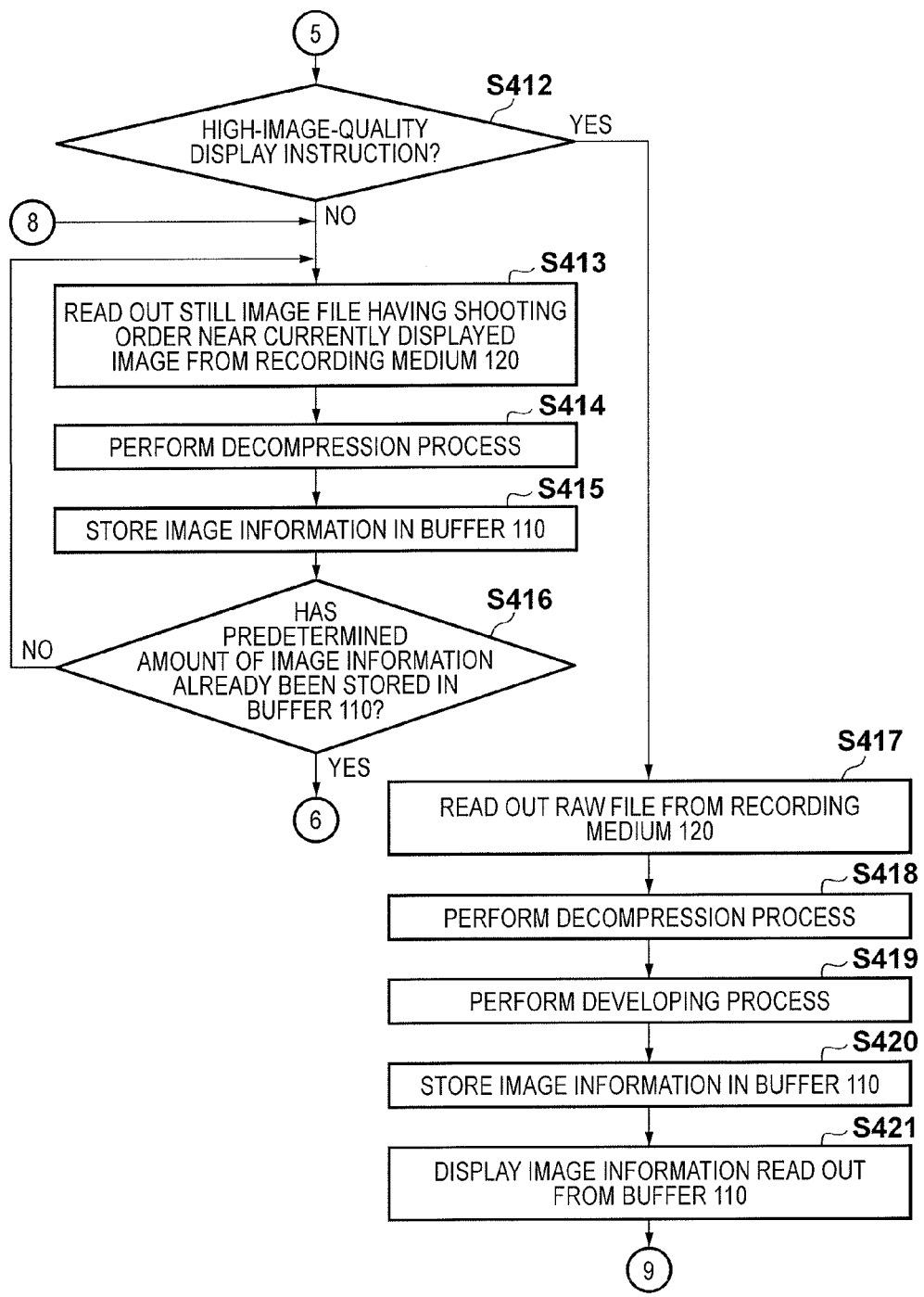

FIGS. 4A to 4C show flowcharts according to an example of processing at the time of playback in this embodiment. The flowcharts of FIGS. 4A to 4C show a processing procedure executed by making a control unit 122 shown in FIG. 1 control and execute each processing block. This procedure is implemented by loading programs stored in a memory (ROM) of the control unit 122 into a memory (RAM) and making the CPU execute the programs. In addition, the flowcharts of FIGS. 4A to 4C are flowcharts starting at a start point where a playback instruction is issued with respect to a desired image file recorded in the recording medium 120.

In the flowchart of FIG. 4A, the processing from step S401 to step S404 is the same as that from step S201 to step S204 in FIG. 2A, and hence a description of the processing will be omitted. In step S404, a display processing unit 112 reads out image information stored in a buffer 110 and displays the information on a display unit 113. Subsequently, in step S405, the control unit 122 determines whether the selected image file is an image file obtained by continuous shooting. If the image file is an image obtained by continuous shooting (YES in step S405), the process advances to step S412. If the image file is not an image obtained by continuous shooting (NO in step S405), the process advances to step S406. However, since the processing from step S406 to step S411 is the same as that from step S206 to step S211 in FIG. 2A, a description of the processing will be omitted.

On the other hand, if the control unit 122 determines in step S405 that the selected image file is an image obtained by continuous shooting (YES in step S405), the process advances to step S412. In step S412, the control unit 122 determines whether the operation unit 121 has issued a high-image-quality display instruction with respect to the image currently displayed on the display unit 113. If no high-image-quality display instruction has been issued (NO in step S412), the process advances to step S413. If a high-image-quality display instruction has been issued (YES in step S412), the process advances to step S417. The processing from step S413 to step S416 is the same as that from step S406 to step S409 described above, that is, the processing from step S206 to step S209. The processing from step S413 to step S415 is repeated until it is determined in step S416 that the image information already stored in the buffer has reached a predetermined amount. If it is determined in step S416 that the image information already stored in the buffer has reached the predetermined amount, the process advances to step S410.

Since the processing from step S417 to step S421 is the same as that from step S212 to step S216 in FIG. 2B, a description of the processing will be omitted. After an image is displayed on the display unit 113 in step S421, the control unit 122 determines in step S422 whether an image file, of image files corresponding to image information not stored in the buffer 110, which corresponds to an image shooting date and time order near the image file currently displayed on the display unit 113 belongs to the same group of continuously shot images to which the currently displayed image file belongs. In this case, the same group of continuously shot images is an image group continuously shot when an image shooting button is pressed once at the time of image shooting.

Note that it is possible to determine whether a given image belongs to the same group of continuously shot images, in accordance with the content of metadata recorded in the header portion of the image. In this case, it is determined whether an image file belongs to the same group of continuously shot images. However, determination may be made concerning the relevancy between images or images belonging to the same group based on other criteria. For example, it is possible to determine, based on the position information contained in the metadata of each image file, the relevancy between images, that is, whether the images are shot in the same place, in accordance with the proximity of image shooting positions, or to determine whether the images belong to the same image group. Alternatively, according to date information, it is possible to determine the relevancy between images based on image shooting dates or an image group shot on the same day. Note that in such a case, the determination in step S405 and the processing from step S406 to step S409 may be omitted, and the process may advances to step S412 after step S404.

If the image file corresponding to the image shooting date and time order near the currently displayed image file belongs to the same group of continuously shot images to which the currently displayed image file belongs (YES in step S422), the process advances to step S427. If the image file does not belong to the same group of continuously shot images (NO in step S422), the process advances to step S423. The processing from step S423 to step S426 is performed in the same manner as the processing from step S406 to step S409 described above, that is, the processing from step S206 to step S209 in FIG. 2A. If it is determined in step S426 that the image information already stored in the buffer is equal to or more than the predetermined amount (YES in step S426), the process advances to step S431. If it is determined in step S426 that the image information is less than the predetermined amount (NO in step S426), the process returns to step S422 to continue the processing. In step S422, processing is performed for another image file, of the image files corresponding to the image information not stored in the buffer 110, which corresponds to an image shooting date and time order near the selected and currently displayed image file. Subsequently, this processing is continued until image information of the predetermined amount is stored in the buffer.

In step S427, the recording/playback unit 119 reads out, from the recording medium 120, a RAW file as an image file corresponding to the image shooting date and time order near the currently displayed image file, which is selected in step S422. The processing from step S428 to step S430 is performed in the same manner as the processing from step S418 to step S420, that is, the processing from step S213 to step S215 in FIG. 2B. Thereafter, if it is determined in step S416 that the image information already stored in the buffer is equal to or more than the predetermined amount (YES in step S426), the process advances to step S431. If the image information is less than the predetermined amount (NO in step S426), the process advances to step S422.

In step S431, the control unit 122 determines whether a normal display instruction has been issued with respect to the image currently displayed on the display unit 113. If a normal display instruction has been issued, the currently displayed image is entirely displayed, and the process advances to step S413. If no normal display instruction has been issued, the process advances to step S432. In step S432, the control unit 122 determines whether a displayed image switching instruction has been issued with respect to the image currently displayed on the display unit 113. If a switching instruction has been issued, the process advances to step S433. If no switching instruction has been issued, the processing in this flowchart is terminated.

In step S433, the control unit 122 determines whether the image newly selected by image switching in step S432 is the image information determined in step S422 as an image belonging to the same group of continuously shot images. If the selected image is the image information determined as an image corresponding to the same group of continuously shot images (YES in step S433), the process advances to step S435. In step S435, the image information obtained by developing a RAW file read out from the buffer 110 is displayed with high image quality on the display unit 113. The process then advances to step S422 to continue the processing. Assume that display conditions such as a display region and a display magnification for high-image-quality display in step S435 are similar to the display conditions for an image before the issuance of the image switching instruction in step S432. In addition, if the selected image is image information which is not determined in step S433 as an image belonging to the same group of continuously shot images (NO in step S433), the process advances to step S434. In step S434, the image information obtained by decompressing the still image file read out from the buffer 110 is displayed on the display unit 113. In this case, the entire image is displayed on the display unit 113. Thereafter, the process advances to step S405 to continue the processing.

Figure 5A:
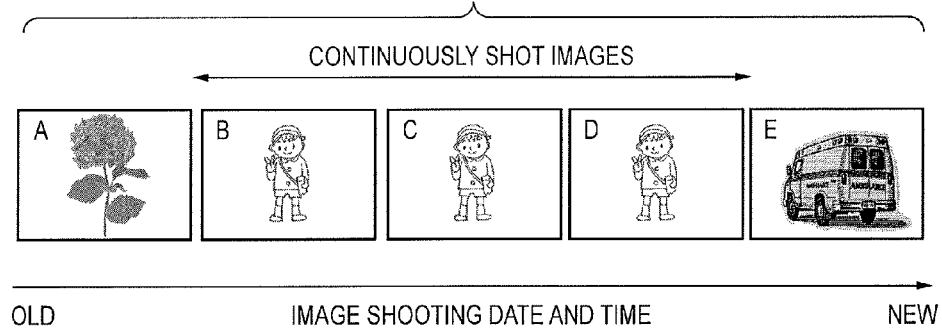
FIGS. 5A to 5E are views each showing a display example at the time of playback described in the second embodiment.

An example of image playback in this image capturing apparatus will be described with reference to FIGS. 5A to 5E. FIG. 5A shows image files recorded in the recording medium 120, with images A to E indicating image files arranged in chronological order of image shooting dates and times. In addition, the three images B to D are continuously shot images obtained by pressing the image shooting button once.

Figure 5B:
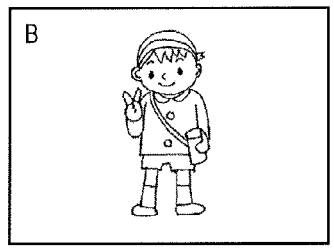

FIG. 5B shows, in this image capturing apparatus, how the image B is selected first, and then the image B is displayed on the display unit 113. Referring to FIG. 5B, since the entire image B is normally displayed on the display unit 113, the still image file read out from the recording medium 120 is displayed. In the present invention, high-speed display processing by image switching is prepared by reading out still image files corresponding to the images A, C, D, and E, causing the JPEG decompression unit 114 in FIG. 1 to perform a decompression process, and accumulating image information in the buffer 110, while displaying the image as shown in FIG. 5B.

Figure 5C:

However, when an instruction to perform enlarged display of a partial region of the image B is issued as a high-image-quality display instruction as indicated by FIG. 5C, an enlarged image is displayed. At this time, RAW files of the images C and D are read out and accumulated in the buffer 118. A RAW decompression unit 116 decompresses these images, and the high-image-quality developing unit 108 develops the images. The developed images are accumulated in the buffer 110. The images A and E do not belong to the same group of continuously shot images to which the selected and currently displayed image B belongs. For this reason, the corresponding still image files are read out and decompressed, and the resultant image information is accumulated in the buffer 110.

Figure 5D:
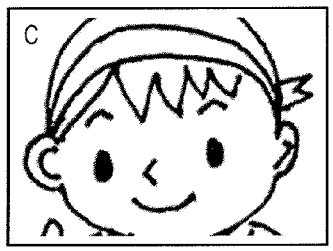

FIG. 5D shows a state in which the displayed image is switched from the state shown in FIG. 5C to the image C which is the image shot at the new image shooting date and time. Since the images B and C belong to the same group of continuously shot images, it is possible to read out the image information developed by the high-image-quality developing unit 108 from the buffer 110 and display the corresponding display regions at high speed. This is an example of processing to be performed when corresponding regions of these images are enlarged and displayed because the images are continuously shot images. However, the image C may be entirely displayed.

Figure 5E:
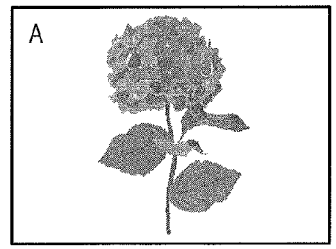

FIG. 5E shows a state in which the displayed image is switched from the state shown in FIG. 5C to the image A which is an image shot at the old image shooting date and time. Since the images A and B do not belong to the same group of continuously shot images, the image information developed by the simple developing unit 107 is read out from the buffer 110, and the entire image is displayed at high speed.

In the above embodiment as well, while a given image is displayed, an image to be displayed next is read out from the recording medium 120 in advance, and a decompression process and a developing process are performed for the image in advance. This makes it possible to quickly display the next image when an image switching instruction is issued. In addition, if an image displayed with high image quality is one of continuously shot images and an image to be displayed upon switching belongs to the same group of continuously shot images, the image to be displayed upon switching can be developed from a RAW file and displayed under the same display conditions (for example, a display region and a display magnification). This makes it possible to compare continuously shot images under the same display conditions (for example, an enlargement condition) at high speed. If the image to be displayed upon switching does not belong to the same group of continuously shot images, it is possible to efficiently display the image upon image switching, without bothering the user to manually return the magnification to the original setting, by decompressing the still image file and displaying the entire image.

Note that in this embodiment, both a still image file and a RAW file undergo processing, in advance, up to the generation of image information immediately before it is read out by the display processing unit 112, that is, image information after developing, and the resultant information is accumulated in the buffer 110. However, if it is a still image file, the information read out from the recording medium 120 may be accumulated in a buffer (not shown in FIG. 1). If it is a RAW file, the information read out from the recording medium 120 is accumulated in the buffer 118. Alternatively, information after a RAW decompression process may be accumulated in a buffer (not shown in FIG. 1). In any of these methods, after an image switching instruction is issued to the operation unit 121, necessary information is read out from a corresponding buffer, and processing up to display is executed afterward. This makes it possible to shorten the time required for display as compared with a playback process starting from reading out a desired image file from the recording medium 120.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-213222 filed Oct. 10, 2013, which is hereby incorporated by reference herein in its entirety.

What is claimed is:

1. An image display apparatus comprising:
a display unit configured to display an image;
a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image;
a developing unit configured to perform a developing process for the RAW image read out by said readout unit with higher image quality than the first developed image;
a decompression unit configured to perform a decompression process for the developed image read out by said readout unit;
a storage unit configured to store the candidate image which is processed by said developing unit or said decompression unit so as to be displayed on said display unit; and a control unit configured to perform control to display the candidate image stored in said storage unit on said display unit by switching from the currently displayed image to the candidate image, in response to an instruction to switch an image displayed on said display unit, wherein said readout unit further configured to selectively read out one of the RAW image and the first developed image obtained by performing the developing process and the compression process for the RAW image, in accordance with image quality of the currently displayed image.

2. An image display apparatus comprising:

a display unit configured to display an image;

a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image;

a developing unit configured to perform a developing process for the RAW image read out by said readout unit with higher image quality than the first developed image;

a decompression unit configured to perform a decompression process for the developed image read out by said readout unit;

a storage unit configured to store the candidate image which is processed by said developing unit or said decompression unit so as to be displayed on said display unit;

a control unit configured to perform control to display the candidate image stored in said storage unit on said display unit by switching from the currently displayed image to the candidate image, in response to an instruction to switch an image displayed on said display unit; and a setting unit configured to set displayed image quality for the currently displayed image, wherein said readout unit further configured to read out the RAW image, when high image quality display is set by said setting unit.

3. An image display apparatus comprising:

a display unit configured to display an image;

a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image;

a developing unit configured to perform a developing process for the RAW image read out by said readout unit with higher image quality than the first developed image;

a decompression unit configured to perform a decompression process for the developed image read out by said readout unit;

a storage unit configured to store the candidate image which is processed by said developing unit or said decompression unit so as to be displayed on said display unit;

a control unit configured to perform control to display the candidate image stored in said storage unit on said display unit by switching from the currently displayed image to the candidate image, in response to an instruction to switch an image displayed on said display unit; and a setting unit configured to set enlarged display of the currently displayed image, wherein said readout unit further configured to read out the RAW image, when enlarged display is set by said setting unit, and to read out the first developed image obtained by performing the developing process and the compression process for the RAW image, when enlarged display is not set by said setting unit.

4. An image display apparatus comprising:

a display unit configured to display an image;

a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image;

a developing unit configured to perform a developing process for the RAW image read out by said readout unit with higher image quality than the first developed image;

a decompression unit configured to perform a decompression process for the developed image read out by said readout unit;

a storage unit configured to store the candidate image which is processed by said developing unit or said decompression so as to be displayed on said display unit;

a control unit configured to perform control to display the candidate image stored in said storage unit on said display unit by switching from the currently displayed image to the candidate image, in response to an instruction to switch an image displayed on said display unit; and a determination unit configured to determine whether the currently displayed image is one of continuously shot images, wherein said readout unit further configured to selectively read out one of the RAW image and the first developed image obtained by performing the developing process and the compression process for the RAW image, in accordance with a determination result obtained by said determination unit.

5. The apparatus according to claim 4, wherein said readout unit further configured to read out the first developed image obtained by performing the developing process and the compression process for the RAW image, when said determination unit determines that the currently displayed image is not one of continuously shot images.

6. The apparatus according to claim 4, wherein said readout unit further configured to select an image to be read out as the candidate image based on an image shooting order, when said determination unit determines that currently displayed image is one of continuously shot images.

7. An image display apparatus comprising:

a display unit configured to display an image;

a readout unit configured to selectively read out one of a RAW image and a first developed image obtained by performing a developing process and a compression process for the RAW image, as a candidate image to be displayed following a currently displayed image, from a storage medium storing the RAW image and the first developed image, in accordance with the currently displayed image;

a developing unit configured to perform a developing process for the RAW image read out by said readout unit with higher image quality than the first developed image;

a decompression unit configured to perform a decompression process for the developed image read out by said readout unit;

a storage unit configured to store the candidate image which is processed by said developing unit or said decompression unit so as to be displayed on said display unit;

a control unit configured to perform control to display the candidate image stored in said storage unit on said display unit by switching from the currently displayed image to the candidate image, in response to an instruction to switch an image displayed on said display unit; and a determination unit configured to determine whether the currently displayed image belongs to an image group set based on image information recorded in a header of each image, wherein said readout unit further configured to selectively read out one of the RAW image and the first developed image obtained by performing the developing process and the compression process for the RAW image, in accordance with a determination result obtained by said determination unit.

* * * * *